(12) United States Patent
Howard et al.

(10) Patent No.: US 6,363,417 B1
(45) Date of Patent: Mar. 26, 2002

(54) DEVICE INTERFACES FOR NETWORKING A COMPUTER AND AN EMBEDDED DEVICE

(75) Inventors: Michael L. Howard, Sandy; William R. Harper, Jr.; Stephen W. Belisle, both of Salt Lake City; Devon S. Sumner, Provo; Howard S. Zollinger, Lehi; Thomas A. Milligan, South Jordan, all of UT (US)

(73) Assignee: emWare, Inc., Salt Lake City, UT (US)

( * ) Notice: Subject to any disclaimer, the term of this patent is extended or adjusted under 35 U.S.C. 154(b) by 0 days.

(21) Appl. No.: 09/539,696

(22) Filed: Mar. 31, 2000

(51) Int. Cl.⁷ .............................................. G06F 15/16
(52) U.S. Cl. ........................ 709/217; 709/203; 709/219
(58) Field of Search ................................. 709/219, 203, 709/217, 205, 224, 208; 705/54, 42, 43, 44, 1, 21; 707/10

(56) References Cited

U.S. PATENT DOCUMENTS

| | | | |
|---|---|---|---|
| 4,812,963 A | * 3/1989 | Albrecht et al. ............ 364/131 |
| 5,544,320 A | * 8/1996 | Konrad | |
| 5,577,251 A | 11/1996 | Hamilton et al. ........... 395/671 |
| 5,768,510 A | * 6/1998 | Gish .......................... 709/203 |
| 5,787,251 A | * 7/1998 | Hamilton et al. ........... 709/203 |
| 5,793,965 A | * 8/1998 | Vanderbilt et al. .......... 709/203 |
| 5,802,530 A | 9/1998 | Van Hoff .................... 707/513 |
| 5,815,712 A | 9/1998 | Bristor et al. ............... 395/701 |
| 5,848,246 A | 12/1998 | Gish ...................... 395/200.58 |
| 5,848,273 A | 12/1998 | Fontana et al. ............. 395/701 |
| 5,870,719 A | 2/1999 | Maritzen et al. ............... 705/26 |
| 5,881,230 A | 3/1999 | Christensen et al. ... 395/200.33 |
| 5,884,317 A | * 3/1999 | Cline et al. .................. 707/103 |
| 5,889,942 A | * 3/1999 | Orenshteyn | |
| 5,960,421 A | * 9/1999 | Cline et al. .................... 707/2 |
| 6,032,198 A | * 2/2000 | Fujii et al. ................... 709/302 |

* cited by examiner

*Primary Examiner*—Ario Etienne
(74) *Attorney, Agent, or Firm*—Madson & Metcalf

(57) ABSTRACT

A system is disclosed for use in a networked computer system that includes a host computer and a remote computer being used to access a device. The system includes a communications module for transferring data to and from a communications port of the host computer. The system also includes a data interface module for accessing an interface definition from a storage device in electronic communication with the host computer. Accessing the interface definition is accomplished through use of an interface definition identifier. A device access controller is also utilized in the system for communicating with the remote computer via the communications module. The device access controller obtains the interface definition identifier from computer program code loaded on the remote computer. In addition, the device access controller accesses the storage device through the data interface module to obtain the interface definition and uses the interface definition identifier to obtain the interface definition. In embodiments herein, there may be a plurality of interface definition identifiers obtained from the computer program code loaded on the remote computer.

31 Claims, 8 Drawing Sheets

| SPECIFIC EMBEDDED DEVICE | SUPPORTED INTERFACES |
|---|---|
| DEVICE ALPHA | A1 |
| DEVICE BETA | C3, C6 |
| DEVICE CHARLIE | A4 |
| DEVICE DELTA | B5, BC1, C1 |
| DEVICE ECHO | B1, B2, B3, B4, B5 |
| DEVICE FOXTROT | C4, C5 |

DEVICE INTERFACES FOR NETWORKING A COMPUTER AND AN EMBEDDED DEVICE

BACKGROUND

1. The Field of the Invention

This invention relates to computer software and, more particularly, to novel systems and methods for providing access to embedded devices through a computer network.

2. The Background Art

In recent years there has been a great increase in the amount of computer technology that is involved in daily life. In today's world, computer technology is involved in many aspects of a person's day. Many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

The small computers, (which can be rather large computers depending on the particular need which is being met by the computer), almost always have one or more processors at the heart of the computer. The processor(s) usually are interconnected to different external inputs and outputs and function to manage the particular device. For example, a processor in a vending machine for soda pop may be connected to the buttons used to select the pop, to the switch that allows a pop to drop down to a user, and to lights to indicate that the machine does not have any more pop of a particular variety.

Computer technology is involved in many aspects of daily life. Many appliances, devices, etc., include one or more small computers. For example, refrigerators, telephones, typewriters, automobiles, vending machines, and many different types of industrial equipment all have small computers, or processors, inside of them. Computer software runs the processors of these computers and tells the processors what to do to carry out certain tasks. For example, the computer software running on a processor in a vending machine may cause a soda pop to drop to a user when the correct change has been entered by a user.

These types of small computers that are a part of a device, appliance, tool, etc., are often referred to as embedded systems. The term "embedded system" usually refers to computer hardware and software that is part of a larger system. Embedded systems usually do not have typical input and output devices such as a keyboard, mouse, and/or monitor. Usually, at the heart of each embedded system is one or more processor(s).

Typically the embedded systems used today with various appliances, devices, etc., do not have a lot of storage capability. As a result, the amount of data that can be stored on the embedded systems is limited. With only limited storage, an embedded system may not have as many features and capabilities as it could have if it had more available storage.

Some embedded systems have been connected to computer networks to allow some communication between the embedded system and a larger computer system. However, because embedded systems are often not equipped with the functionality to effectively and efficiently communicate with other computer systems, the communication capability is usually limited. In addition, the means for communicating with embedded systems is often a slower type of communication pathway and, accordingly, only limited amounts of data are passed to and from the embedded systems.

Because of the constrained memory resources on the embedded systems and because of the typically limited communications means, often only limited interaction from a computer network with the embedded system is available. This interaction is often of limited use because of the difficulty in communicating with the different parts of the embedded system.

BRIEF SUMMARY AND OBJECTS OF THE INVENTION

In view of the foregoing, it is an object of embodiments herein to provide access to an embedded system and the services available at the embedded system from a computer in electronic communication with the embedded system.

Consistent with the foregoing objects, and in accordance with the embodiments broadly described herein, a system is disclosed for use in a networked computer system that includes a host computer and a remote computer being used to access a device. The system includes a communications module for transferring data to and from a communications port of the host computer. The system also includes a data interface module for accessing an interface definition from a storage device in electronic communication with the host computer. Accessing the interface definition is accomplished through use of an interface definition identifier. A device access controller is also utilized in the system for communicating with the remote computer via the communications module. The device access controller obtains the interface definition identifier from computer program code loaded on the remote computer. In addition, the device access controller accesses the storage device through the data interface module to obtain the interface definition and uses the interface definition identifier to obtain the interface definition. In embodiments herein, there may be a plurality of interface definition identifiers obtained from the computer program code loaded on the remote computer.

A method practiced in accordance with embodiments herein may include the steps of establishing electronic communications between the host computer and the remote computer, receiving the interface definition identifier and accessing the interface definition from the storage device using the interface definition identifier. A method further includes the steps of providing the interface at the host computer for communicating with the remote computer and facilitating communications with the remote computer via the interface.

BRIEF DESCRIPTION OF THE DRAWINGS

The foregoing and other objects and features of the embodiments will become more fully apparent from the following description and appended claims, taken in conjunction with the accompanying drawings. Understanding that these drawings depict only typical embodiments and are, therefore, not to be considered limiting of its scope, the embodiments will be described with additional specificity and detail through use of the accompanying drawings in which:

DETAILED DESCRIPTION

Figure 1:
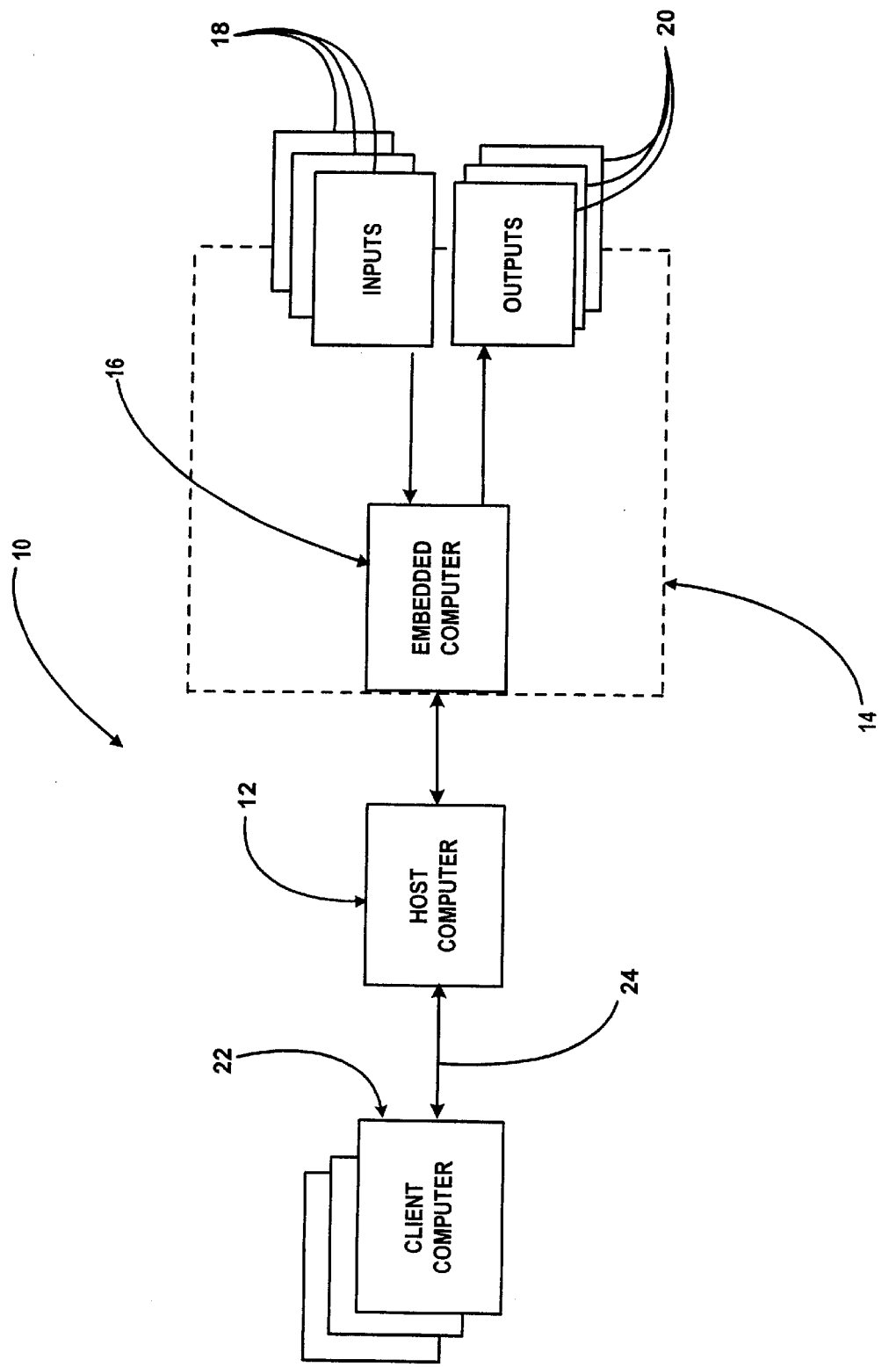
FIG. 1 is block diagram of the major hardware components included in the present embodiments.

It will be readily understood that the components of the embodiments, as generally described and illustrated in the Figures herein, could be arranged and designed in a wide variety of different configurations. Thus, the following more detailed description of the embodiments of the system and method, as represented in FIGS. 1 through 10, is not intended to limit the scope of the invention, as claimed, but is merely representative of embodiments of the invention.

The present embodiments will be best understood by reference to the drawings, wherein like parts are designated by like numerals throughout.

A system is disclosed for use in a networked computer system that includes a host computer and a remote computer being used to access a device. The system includes a communications module for transferring data to and from a communications port of the host computer. The system also includes a data interface module for accessing an interface definition from a storage device in electronic communication with the host computer. Accessing the interface definition is accomplished through use of an interface definition identifier. A device access controller is also utilized in the system for communicating with the remote computer via the communications module. The device access controller obtains the interface definition identifier from computer program code loaded on the remote computer. In addition, the device access controller accesses the storage device through the data interface module to obtain the interface definition and uses the interface definition identifier to obtain the interface definition. In embodiments herein, there may be a plurality of interface definition identifiers obtained from the computer program code loaded on the remote computer.

The interface definition may include information that relates to the computer program code. The computer program code, or application code on the remote computer, or a combination thereof, may provide services related to the device. The remote computer may include a services list that describes or relates to the certain services. The services list may include various types of information, including a list of functions, variables, data types, events and files.

The system may also include a device access server for receiving requests from client computers to provide access to the remote computer and/or to the services (e.g., functions, variables, data types, events and files) available on the remote computer.

A method practiced in accordance with embodiments herein may include the steps of establishing electronic communications between the host computer and the remote computer, receiving the interface definition identifier and accessing the interface definition from the storage device using the interface definition identifier. A method further includes the steps of providing the interface at the host computer for communicating with the remote computer and facilitating communications with the remote computer via the interface.

The method may also include the step of receiving a request from the client computer to provide access to the remote computer. The interface may be provided to the client computer. The method may also include receiving an interface-based request from the client computer, where the interface-based request was created at the client computer through use of the interface. A message may also be sent to the remote computer from the host computer that relates to the interface-based request. The remote computer may send device data back to the host computer in response to the message sent to the remote computer.

Of course, it will be appreciated by those skilled in the art that the method may be embodied in executable instructions stored on a computer-readable medium.

FIG. 1 is block diagram illustrating the major hardware components typically utilized in the embodiments. In the present embodiments, the systems and methods herein are used in a networked computer system 10 where a host computer 12 is connected to an embedded device 14. Typically the embedded device 14 includes a computer 16 connected to input and output devices 18, 20. The computer 16, in the present embodiments, is an embedded computer 16. Particularly, in the present embodiments, the computer 16 comprises a microcontroller (not shown). However, it will be appreciated by one skilled in the art that the functions and processing normally carried out by a microcontroller could be carried out by larger processors, whether they are part of a larger controller or part of a typical computer system.

The embedded computer 16 is remote from the host computer 12, in that the embedded computer 16 and host computer 12 are each computers capable of functioning on their own. The term remote does not necessarily mean that the embedded computer 16 is at a different location than the host computer 12, although in many embodiments the host computer 12 is at a different location than the embedded computer 16. The terms embedded computer 16 and remote computer 16 may be used interchangeably herein. Those elements discussed as being stored and/or implemented by the remote computer 16 could be stored and/or implemented at the host computer 12, in some circumstances.

The present systems and methods have broad application to many kinds of computer networks 10. Generally, the computer system 10 includes one or more client computers for monitoring and/or controlling the embedded device 14. The remote computer 16 is operably connected to input and/or output devices 18, 20 capable of electronic communication with the remote computer 16, or, in other words, to devices 18, 20 capable of input and/or output in the form of an electrical signal. Sometimes the input and output device (s) 18, 20 and the remote computer 16 are both housed within the same physical structure.

The host computer 12 and the remote computer 16 are both broadly defined digital computers. A computer, as used herein, is any device that includes a digital processor capable of receiving and processing data. A computer includes the broad range of digital computers including microcontrollers, hand-held computers, personal computers, servers, mainframes, supercomputers, and any variation or related device thereof.

The input and output devices 18, 20 include any component, element, mechanism, appliance, or the like capable of receiving and/or generating an electronic signal. Examples of devices within the scope of the term device includes a vending machine, a telephone, a door lock, a temperature sensor, a motor, a switch, and a light.

In current design, the host computer 12 is typically an IBM-compatible personal computer running Linux, Microsoft Windows 95/98/2000 or the Microsoft Windows NT operating system. The remote computer 16 typically includes an embedded processor (not shown), and, as stated, often includes a microcontroller. The devices 18, 20 can be any devices with electronic interfaces of which a processor could interface and interact with.

One possible item that may be used with the embodiments herein is a vending machine (not shown). Many vending machines include one or more microcontrollers for controlling different parts of the vending machines. These microcontrollers fall within the scope of remote computer 16. The input and output devices 18, 20 include the buttons for selecting items from the vending machine, switches for allowing those items to be dropped down to the user, lights for indicating which items are gone, the change release for releasing any change, etc. As known in the art, this vending machine embodiment includes the input and output devices 18, 20 and the remote computer(s) 16 integrated within the same structure. The present systems and methods, therefore, may be implemented in such an environment. Those skilled in the art will also realize that the remote computer 16 may be in a separate structure from its attached input and output device(s) 18, 20. Many of the modern devices do come with embedded microcontrollers, for example, many cellular phones, pagers, and the like come with embedded microcontrollers.

The host computer 12 may be connected to the remote computer 16 through a variety of connections, including RS 232, RS 485, modem, powerline, wired connection, wireless connection, etc. Similarly, the remote computer 16 may be connected to various input and output devices 18, 20 through a variety of ways. As stated, typically the remote computer 16 comprises a microcontroller (not shown). Microcontrollers often have input/output ports for communicating with external devices. The specifications of the particular microcontroller often dictate how a device is connected to the microcontroller. Those skilled in the art appreciate how different devices may be connected to computers, whether they are embedded computers, standard desktop computers, mainframes, etc.

As stated, client computers 22 may also be included within the computer system 10. Such a configuration allows users to access services at the remote computer 14 through the host computer 12, even over great distances. The host computer 12 and the client computers 22 may all be connected together on a computer network 24, such as a LAN, WAN, etc. In addition, the client computer 22 may connect from a remote location to the host computer 12 via a dial up connection, via an intranet, or via the Internet.

Figure 2:
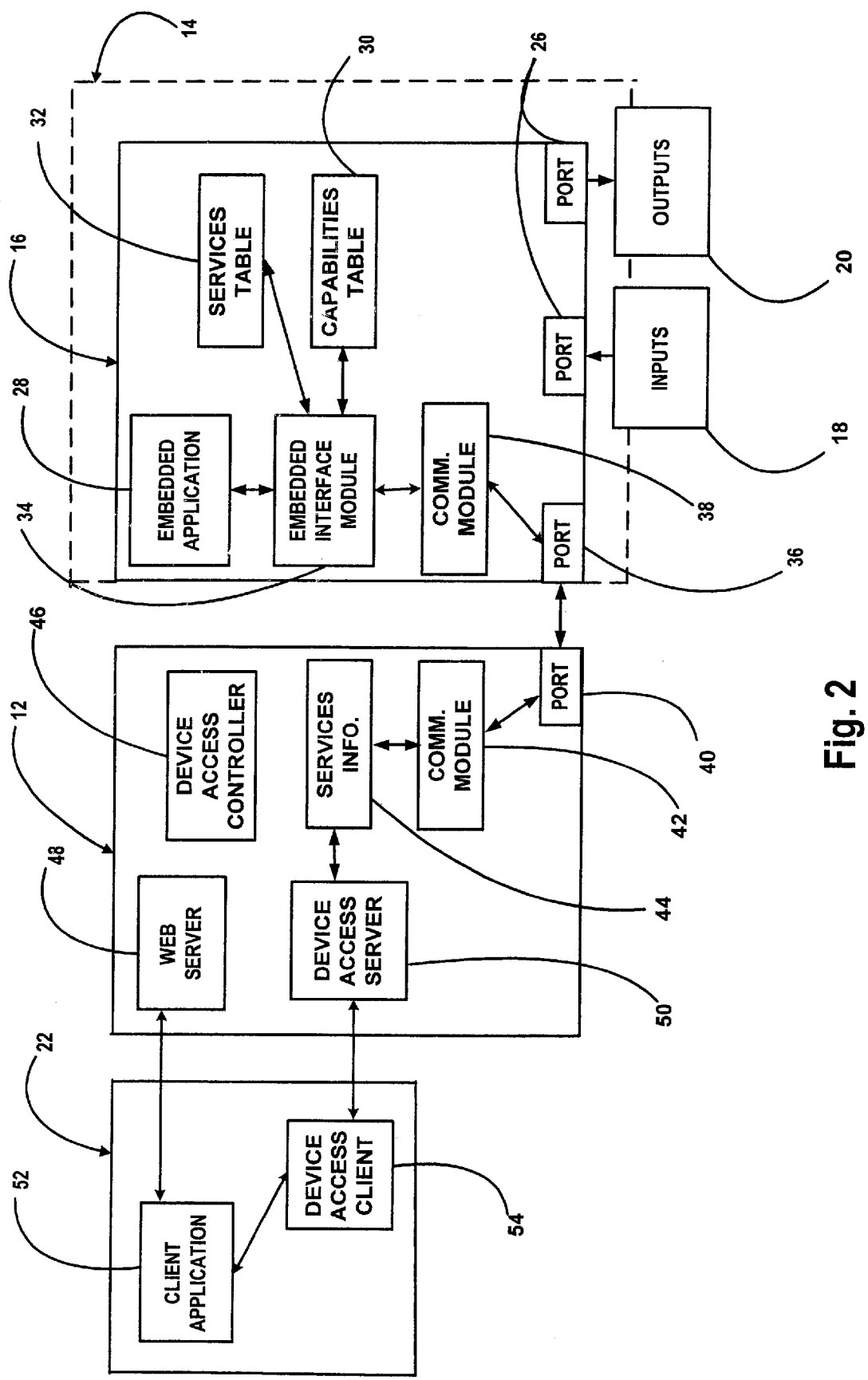
FIG. 2 is block diagram of the major hardware and software components included in embodiments.

FIG. 2 depicts a block diagram of the major hardware and software components of the present embodiments. As shown, the hardware elements of FIG. 2 correlate with those of FIG. 1. Those skilled in the art will appreciate that there are a variety of ways to interconnect the various hardware components, and that there are various configurations wherein one or more of the hardware elements may be eliminated by moving functionality from one hardware element to another.

The present embodiments enable a user to monitor and/or control services provided by the embedded computer 16 through a host computer 12. The services of the embedded computer 16 are exposed by the embodiments such that they may be accessed over the computer network 10 and in an efficient manner.

In the present embodiments, data from input and/or output devices 18, 20 is read in and/or written out through input/output ports 26. An embedded application program 28 includes the executable instructions that directly interface with these input and/or output ports 26. Usually embedded applications 28 have a main loop which is iterated through over and over. Of course, embedded application developers may write an application that does not have a main loop that is continually iterated through. The principles herein could be applied to those applications not having a main loop and provide substantially the same benefits as are realized in the present embodiments.

Basic information about the embedded or remote computer 16, its characteristics and capabilities are useful in practicing the embodiments herein. Such basic information may be stored at the remote computer 16 in a capabilities table 30. The capabilities table 30 may be stored as a file, or it may be stored as static data that is compiled with the application 28, or it may be stored on a storage device (not shown) external to the remote computer 16. Those skilled in the art will realize that there are a variety of ways to store basic capabilities of a remote computer 16 and its connected input and/or output devices 18, 20. Table 1 contains pseudocode illustrating what types of information may be stored in the capabilities table 30.

TABLE 1

| | |
|---|---|
| 1A | interfaces supported |
| 1B | byte ordering type |
| 1C | device identification |
| 1D | device address |
| 1E | software version |
| 1F | communication protocol version |
| 1G | maximum communication packet size |
| 1H | nonvolatile storage flag (indicates yes or no) |
| 1I | nonvolatile storage size, starting address |
| 1J | static file system flag |
| 1K | dynamic file system flag |

As illustrated in Table 1, the capabilities table may include an indication of what interface definitions (1A) the remote computer supports. The interface definitions (1A) field and its use will be more fully described herein. The capabilities table may also indicate the byte order type shown at line (1B). This byte ordering type (1B) may indicate whether the remote or embedded computer 16 is big endian or little endian. The table may also indicate what the device identification, shown at line (1C), is for that particular remote or embedded computer 16. The device address, shown at line (1D), if any, may also be stored in the capabilities table 30.

For compatibility purposes, the version numbers, shown at line (1E), for the software being used may also be stored. Similarly the communication protocol version numbers, shown at line (1F), may also be stored. Particulars about the communication may also be stored. For example, as shown in Table 1, the maximum communication packet size, shown at line (1G), may be stored.

A nonvolatile storage flag shown at line (1H) may indicate whether there is nonvolatile storage accessible by the remote computer 16. Pertinent information about the nonvolatile storage may also be stored, such as the nonvolatile storage size and its starting address, shown at line (1I). A static file system flag, shown at line (1J), may indicate whether there is a static file system. Similarly, a dynamic file system flag, shown at line (1K), may indicate whether there is a dynamic file system.

The capabilities table 30 is useful in that software at the host computer 12 can request the capabilities table 30 and ascertain the characteristics and capabilities of the embedded computer 16. However, as will be explained more fully herein, the interfaces supported field (1A) in combination with the systems and methods disclosed herein may obviate the need to transfer the entire capabilities table 30 to the host computer 12 or to transfer the equivalent information of the capabilities table to the host computer.

Users, through software running on the client computer 22 and/or the host computer 12, may wish to access certain services provided by the remote embedded computer 16. Services include different functions, variables, events, and/or files. For example, users may wish to execute particular functions, access certain variables, check on specified events, or access specific files. In current design, the services that a user may need access to are identified and listed. The identification of services also includes information about the certain services. This identification of certain services may be accomplished in a variety of ways. For example, in current design, a table 32 of services may be stored at the remote computer 16. The services table 32 may be stored as a file, or it may be stored as static data that is compiled with the application, or it may be stored on a storage device (not shown) external to the remote computer 16. Those skilled in the art will realize that there are a variety of ways to store basic information about certain services provided by the application code 28 running on the embedded computer 16. Table 2 contains pseudocode illustrating what types of information may be stored in the services table 32.

TABLE 2

| | |
|---|---|
| 2A | "FunctionA", function, word, void, &FunctionA |
| 2B | "FunctionB", function, int, float, &FunctionB |
| 2C | "VarA", variable, int, void, &varA |
| 2D | "VarB", variable, string, void, &varB |
| 2E | "EventA", event, byte, void, &eventA |
| 2F | "EventB", event, int, void, null |
| 2G | "FileA", file, void, void, &fileA |
| 2H | "FileB", file, void, void, &fileB |

As illustrated in Table 2, the services table 32 may include information such as the name or identification of the service, the type of service (e.g., whether it is a function, variable, event, file, etc.), the input parameter type, if any, the return type, if any, and the address of the service. Information about function FunctionA, shown at line (2A), is illustrated indicating that it is a function, it takes a word as an input parameter, it returns nothing (void), and its address is indicated at &FunctionA. Line (2B) illustrates the information about another function, FunctionB. Relevant information about variables are illustrated at lines (2C)–(2D). Information about events is illustrated at lines (2E)–(2F). Events may be any type of data. For example, an event could be a variable, a particular register, an interrupt, etc. Events may be particularly useful for items that occur a synchronously. Examples of asynchronous types of events include an alarm going off or an external LED changing. Information about certain files are illustrated at lines (2G) and (2H).

By storing information about certain services at the remote computer 16, software on the host computer 12 can readily ascertain what services are available at the remote computer 16. Usually the application code 28 defines the services. The services table 32 functions to provide information about certain services, where the information would be useful to a user at the host computer 12, or to a user at the client computer 22 connected thereto.

In current design, an embedded interface module 34 provides access between the services at the remote computer 16 and software running at the host computer 12. In embodiments herein, the interface module 34 uses information in the services table 32 to access the desired service on the remote computer 16. Further, in the presently preferred embodiment, the interface module 34 is reentrant code.

The interface module 34 communicates through an embedded communications port 36. In current design, a communications module 38 provides communication using the communications port 36. One skilled in the art will appreciate, however, that the interface module 34 may include the code necessary to directly interface with the communications port 36 at the remote computer 16. The communications module 38 or code 38 provides access to the communications port 36, and ensures that data is given to the communications port 36 in appropriately sized and formatted pieces, and that data received from the communications port 36 is correctly read from the port 36.

The host computer 12 includes a communication port 40 in electronic communication with the communications port 36 of the remote computer 16. As discussed earlier, there are a variety of such ports available with computers that are capable of interfacing with a remote and/or embedded computer port 36. A communication module 42 provides features similar to those provided by the communications module 38 of the remote computer 16. The communications module 42 correctly formats data that is written to and read from the communications port 40.

The host computer 12 provides access to the services provided at the embedded computer 16. In the present embodiments, a portion of the capabilities table 30, the interfaces supported information, is retrieved from the embedded computer 16 and from it a list of the services is created at the host computer 12 that substantially corresponds to the services table 32. The list of services at the host computer 12 is referred to in FIG. 2 as services information 44. The services information 44 indicates what services are available at the remote computer 16 and what data types, if any, are used with individual services. This facilitates access via the host computer 12 to the remote or embedded computer 16.

In current design, a process is initially started on the host computer 12 that causes the services information 44 to be created. The device access controller 46 provides this initial direction, in current design.

As stated, the embodiments may provide access to the services of the embedded computer 16 to client computers 22 that are in electronic communication with the host computer 12. To facilitate access by client computers 22, the host computer 12 may include servers. A web server 48 may be started at the host computer 12. The web server 48 may provide a web interface to services at the remote computer 16. For example, the data and/or services of the remote computer 16 may be represented graphically through HTML pages. Thus, the device access controller 46, may create web pages (not shown) from the services available at the remote computer 16, and the web server 48 may service HTTP requests for these web pages.

A device access server 50 may also be included at the host computer 12 to service client requests for services of the remote computer 16. In current design, the device access server 50 accesses the services information 44 and makes this information available to clients at client computers 22.

A client computer 22 may include a client application 52 and a device access client 54. The device access client 54 communicates with the device access server 50 to access the services of the remote computer 16. The client application 52 may use the device access client 54 to obtain information about the services. The client application 52 could also access data from the web server 48 located at the host computer 12. For example, the client application 52 may be a web browser capable of connecting to the web server 48.

Figures 3, 4:
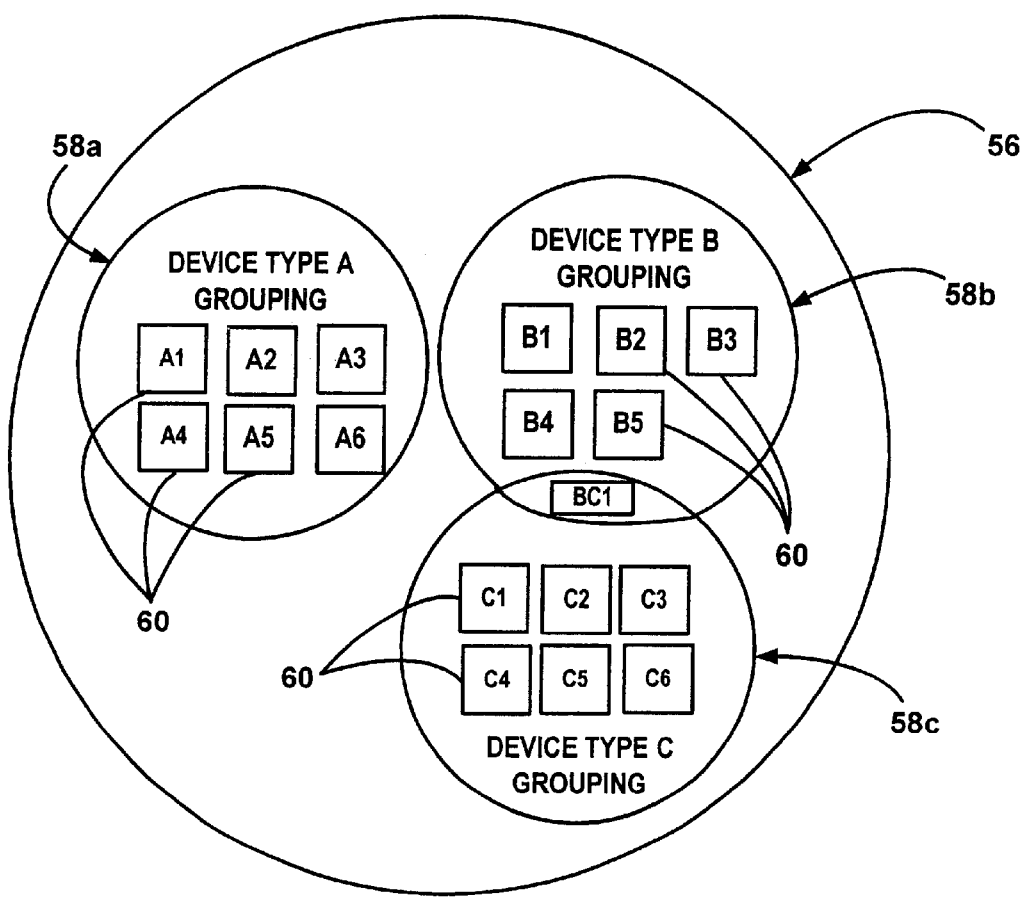
FIG. 3 is a diagram illustrating a group of all embedded devices and certain sub-groupings within the group that may be formed that include certain devices.
FIG. 4 is a table illustrating that there may be a one to many correspondence between a specific embedded device and the interfaces that it supports.

Referring to FIG. 3, a set of interface definitions may be created to effectively communicate what services are available at the remote computer 16 in an effective manner. Shown in FIG. 3 is the embedded device space 56 that illustrates a grouping 56 for all embedded devices available for use. This embedded device space 56 may be divided into separate groupings 58. For example, a device type A grouping 58a may be formed, as well as a device type B grouping 58b and a device type C grouping 58c. The groupings 58 may group together certain devices into logical groups where the members in each group have at least one or more similar characteristics. For example, the device type A grouping 58a may be for vending machine devices. Other exemplary groupings include cellular telephones, refrigerators, temperature controllers, copiers, etc.

Within each grouping 58 may be specific interface definitions 60 for different types of remote computers 16. Each interface definition 60 defines a specific set of functions, variables, events, files, behaviors, states and other information which is support by any remote computer 16 which holds itself out as meeting that particular interface definition 60. Accordingly, when an embedded engineer is designing an embedded system including a remote computer 16, if he or she desires to utilize the benefits of the embodiments herein, he or she may select an appropriate interface definition 60 to support and then design and implement the system accordingly. In addition, should no interface definition 60 exist that is acceptable, the engineer may define a new interface definition 60, publish it to those who may benefit from its use and/or knowledge, and then design and implement the system accordingly.

Various interface definitions 60 are represented in FIG. 3 as A1, A2, A3, etc. Those skilled in the art will realize that there are a variety of ways to define characteristics of a remote computer 16 or embedded device. Table 3 contains pseudocode illustrating what types of information may be defined and included in an interface definition 60.

TABLE 3

| 3A | "FunctionA", function, word, void, &FunctionA |
|----|-----------------------------------------------|
| 3B | "FunctionB", function, int, float, &FunctionB |
| 3C | "VarA", variable, int, void, &varA |
| 3D | "VarB", variable, string, void, &varB |
| 3E | "EventA", event, byte, void, &eventA |
| 3F | "EventB", event, int, void, null |
| 3G | "FileA", file, void, void, &fileA |

TABLE 3-continued

| 3H | "FileB", file, void, void, &fileB |
|----|-----------------------------------|
| 3I | State information |
| 3J | Behavior information |
| 3K | Other |

As illustrated in Table 3, an interface definition may include information such as the name or identification of the service, the type of service (e.g., whether it is a function, variable, event, file, etc.), the input parameter type, if any, the return type, if any, and the address of the service. Information about function FunctionA, shown at line (3A), is illustrated indicating that it is a function, it takes a word as an input parameter, it returns nothing (void), and its address is indicated at & FunctionA. Line (3B) illustrates the information about another function, FunctionB. Relevant information about variables are illustrated at lines (3C)–(3D).

Information about events is illustrated at lines (3E)–(3F). Events may be any type of data. For example, an event could be a variable, a particular register, an interrupt, etc. Events may be particularly useful for items that occur a synchronously. Examples of asynchronous types of events include an alarm going off or an external LED changing.

Information about certain files are illustrated at lines (3G) and (3H). State information (3I) may also be included. The state information (3I) may include information defining what various states the remote computer 16 may be in, information defining any state machines of the remote computer 16, etc. Behavior information (3J) may indicate how the remote computer 16 will react and behave given a certain set of inputs, outputs and/or states. Of course, other (3K) defining information may be included as well, as those skilled in the art see fit.

FIG. 4 is a table illustrating that there may be a one to many correspondence between a specific embedded device and the interfaces that it supports, or the interface definitions that it follows. Device Alpha of FIG. 4 supports the A1 interface definition 60 of FIG. 3. Device Beta supports more than one interface definition 60; it supports C3 and C6. FIG. 4 illustrates that other specific embedded devices may support one or more interface definitions 60.

Figure 5:
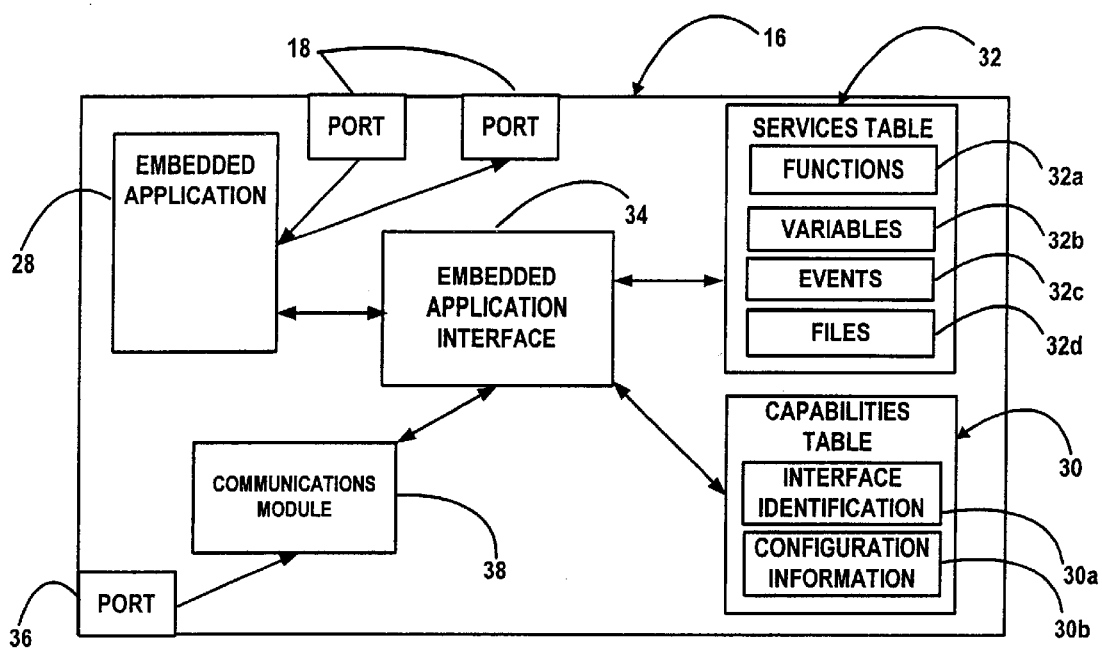
FIG. 5 illustrates a remote computer of an embodiment and illustrates the items that may be included in the services table and capabilities table.

FIG. 5 illustrates the remote computer 16 of an embodiment and illustrates the items that may be included in the services table 32 and capabilities table 30. As discussed in relation to Table 2, the services table 32 may include information about functions 32a, variables 32b, events 32c and/or files 32d of the remote computer 16. The capabilities table 30 may include data comprising interface identifications 30a for the remote computer 16. As shown in FIG. 4, a remote computer 16 may include one or more interface definition identifiers. These interface definition identifiers may be a number, a string or any other piece of data capable of being used as a way to identify a particular interface definition. Through use of the present embodiments, a host computer 12 may ascertain much about a particular remote computer 16 simply by obtaining its interface identifications 30a without having to obtain all the defining information from the remote computer 16 itself. This may be useful because in some environments, remote computers 16 do not have the necessary communications capacity to send large amounts of information to another computer. The capabilities table 30 may include other configuration information 30b as needed.

Figure 6:
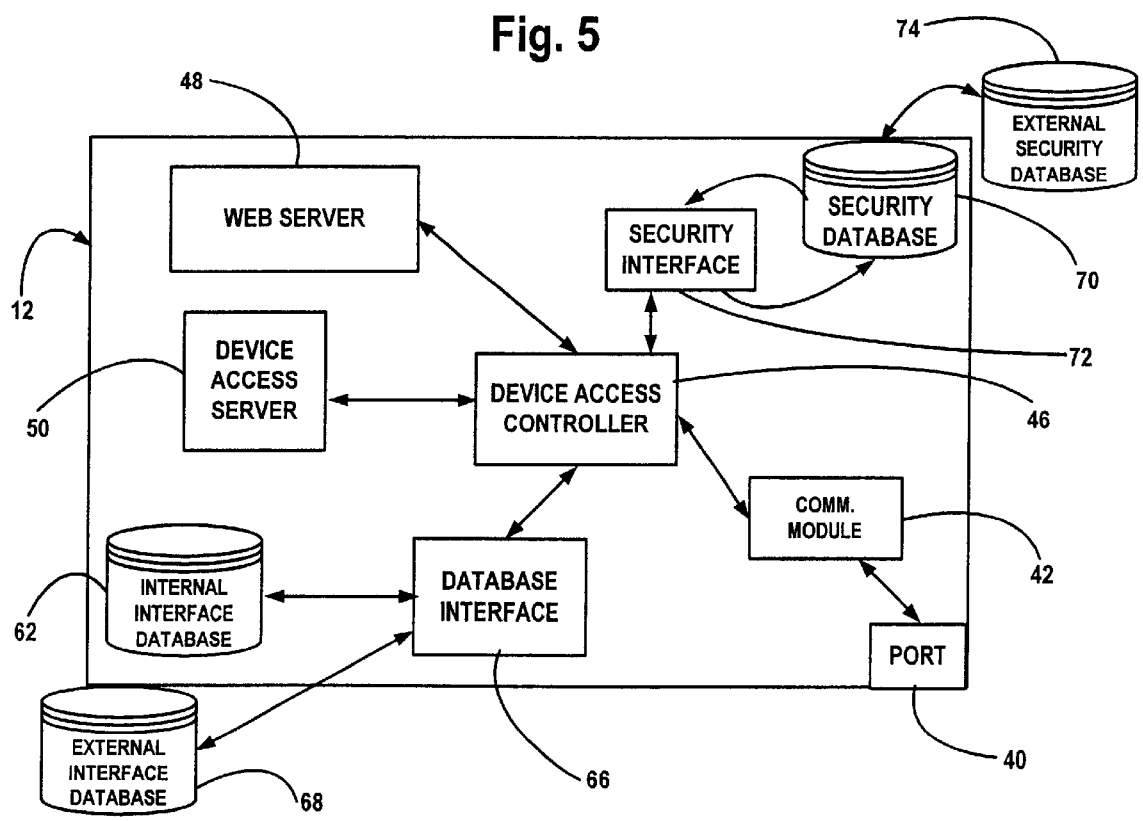
FIG. 6 illustrates the host computer of an embodiment and illustrates software components or functionality that may used on the host computer.

FIG. 6 illustrates the host computer 12 of an embodiment and illustrates software components or functionality that may used on the host computer 12. The host computer 12 may include an internal interface database 62. This internal interface database 62 may contain a number of interface definitions 60 indexed by interface definition identifiers 64. Accordingly, when the device access controller 46 obtains an interface definition identifier 64 from the remote computer 16, it may access the internal interface database 62 through a database interface 66 to access and retrieve the particular interface definition(s) 60 supported by the remote computer 16. Thus, the host computer 12 may obtain information that defines the remote computer 16 without having to receive all of such information from the remote computer 16.

In addition to the internal interface database 62, there may be an external interface database 68. The external interface database 68 may be accessed when the database interface 66 cannot find the particular interface definition(s) 60 in the internal interface database 62. The external interface database 68 may be located on a computer network to which the host computer 12 is connected. In addition, the external interface database 68 may be accessible via the Internet, a dial up connection, through an intranet, etc. The device access controller 46 may periodically update the internal interface database 62 with updates from the external interface database 68.

The embodiments herein may also implement security measures through use of various interface definitions 60 for a specific device. For example, there may be a number of services available at a remote computer 16 that should only be accessed by an entity holding the proper authority. A more specific example of this is a vending machine. A vending machine may have certain functions that should only be accessed by an authorized entity, such as, for example, the ability to change the prices on certain items, to drop certain items without payment or to lock certain items so that they may not be purchased. One interface definition 60 may provide access to these administrative functions. However, others accessing the vending machine would typically not have access to these administrative functions. Accordingly, a vending machine may support a number of interfaces including an administrator's interface and a non-administrator's interface. In embodiments herein, the remote computer 16 of the vending machine may include interface definition identifiers 64 for both of these interfaces. In embodiments herein, it may be the task of the host computer 12 to provide the proper interface to any client applications 52 based on proper authorization.

Figure 10:
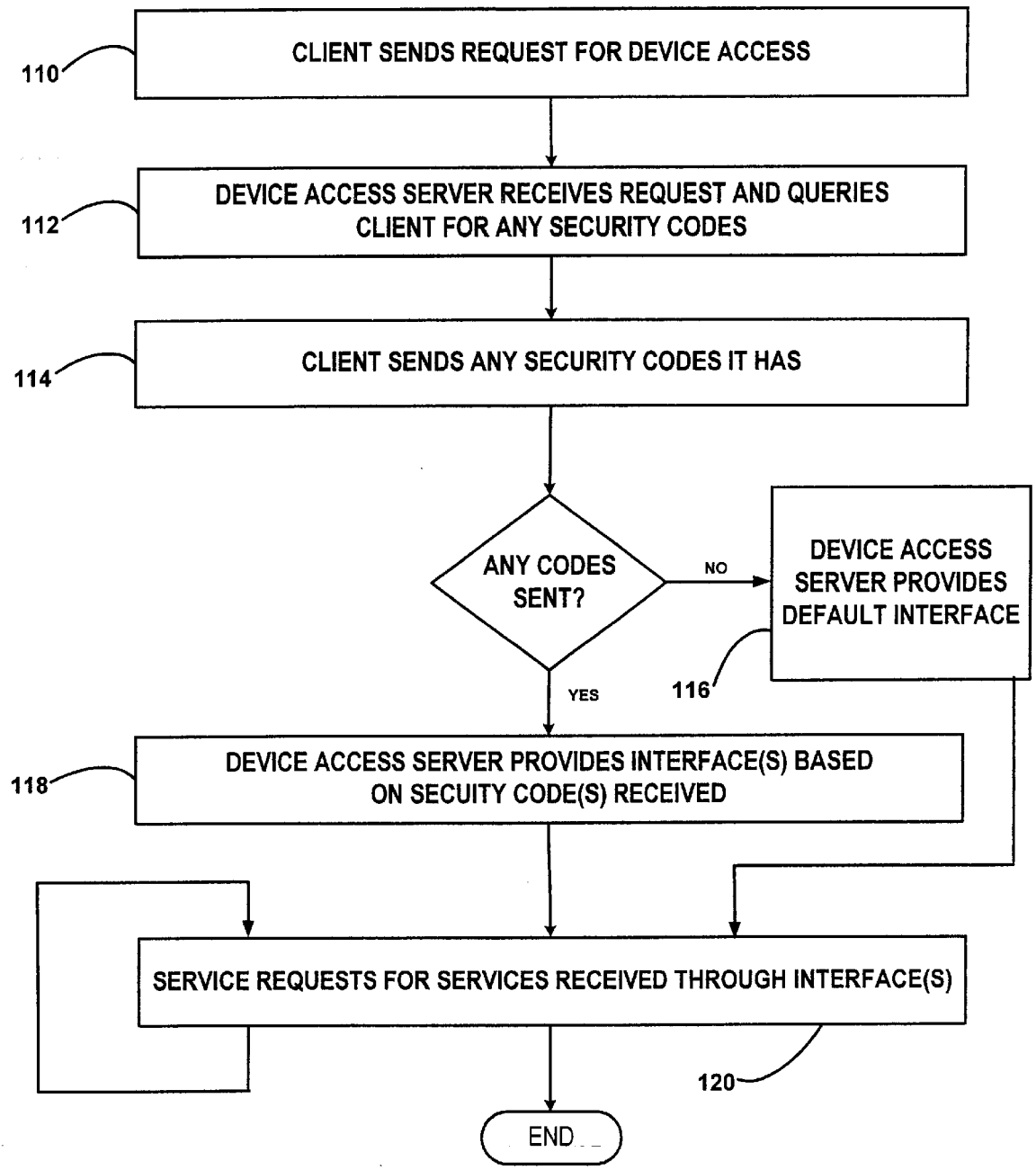
FIG. 10 is a flow diagram illustrating steps that may be followed in using a security code to provide the proper interface to a client application.

To provide the proper interface to any client applications 52 based on proper authorization, the device access controller 46 may access a security database 70 through a security interface module 72. The security database 70 may contain information for validating proper client applications 52 or for looking up in an index (not shown) in the security database 70 what particular interface should be provided to certain client applications 52. User names and passwords may be stored in the security database 70 to validate proper authorization. In addition, an index (not shown) of possible client applications 52 may be stored along with a listing (not shown) of the interfaces that should be provided to such client applications 52. Of course, an external security database 74 may be used and accessed, as will be appreciated by those skilled in the art. For example, the device access controller 46 may access an external security database 74 over a computer network (e.g., the Internet, an intranet, a LAN, etc.) for security purposes. FIG. 10 illustrates steps that may be followed in providing the proper interfaces to client applications 52.

Figure 7:
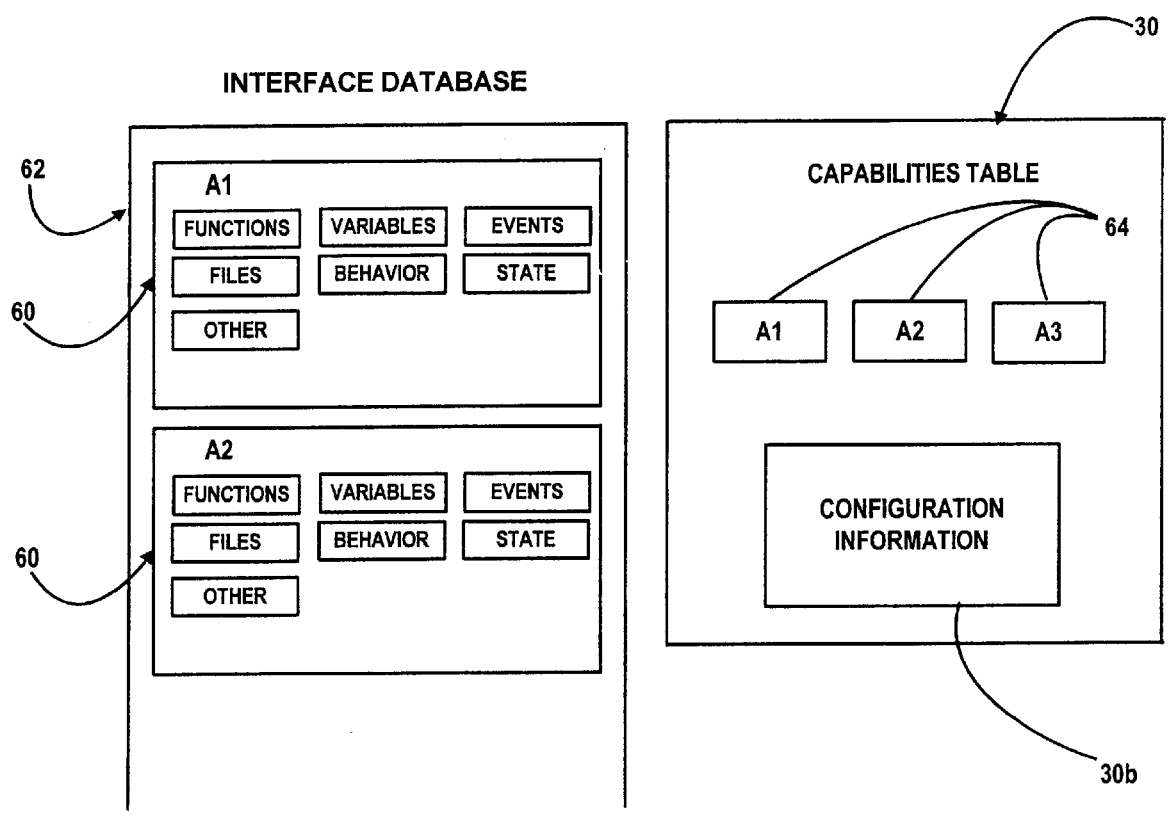
FIG. 7 illustrates interface definition identifiers in a capabilities table of an embodiment and their correlation to specific interface definitions in an interface database.

FIG. 7 illustrates how interface definition identifiers 64 in the capabilities table 30 of a remote computer 16 may be used to identify specific interface definitions 60 in an interface database 62. The interface database 62 and the interface definitions 60 may include the types of information discussed herein, as well as any additional information that may be useful to those skilled in the art. For example, the interface definitions 60 may include information as discussed in relation to Table 3, such as information describing the functions, variables, events, files, the behavior, the states, and any other information about the remote computer 16 and/or the embedded system that those skilled in the art see fit to include in the interface definition 60.

The services information 44 created from the interface definition 60 may be an object implementation whereby the services information 44 is encapsulated. Users of the embodiments may encapsulate the services information 44 of the remote computer 16 by using a software object at the host computer 12. The object (not shown) may provide an object representation of at least part of the remote computer system 14, where the remote computer system 14 includes both the remote computer 16 and its connected devices 18, 20. Part of the object may be used mainly to access the services provided by the remote computer 16. By implementing an object on the host computer 12, developers are provided with the many benefits of object-oriented analysis and design without using valuable memory resources on the remote computer 16 to provide these benefits. In current design, only items necessary for storage on the remote computer 16 are stored at the remote computer 16. Of course, it will be appreciated by those skilled in the art that, if the remote computer 16 did have access to a substantial amount of memory, many more items could be stored at the remote computer 16.

An object is a description of a data structure. An object, as used herein, is an abstract data type that encapsulates data and/or functions. Accordingly, one skilled in the art could implement a data structure equivalent to an object, without using object-oriented features of certain programming languages. Specifically, an object as used herein does not require that software developers use object-oriented languages such as C++ or Smalltalk. An object within the scope of the present invention could be implemented in any programming language. For example, an object could be implemented in C, C++, Pascal, FORTRAN, assembly language, etc. In current design, the C programming language is being used.

Figure 8:
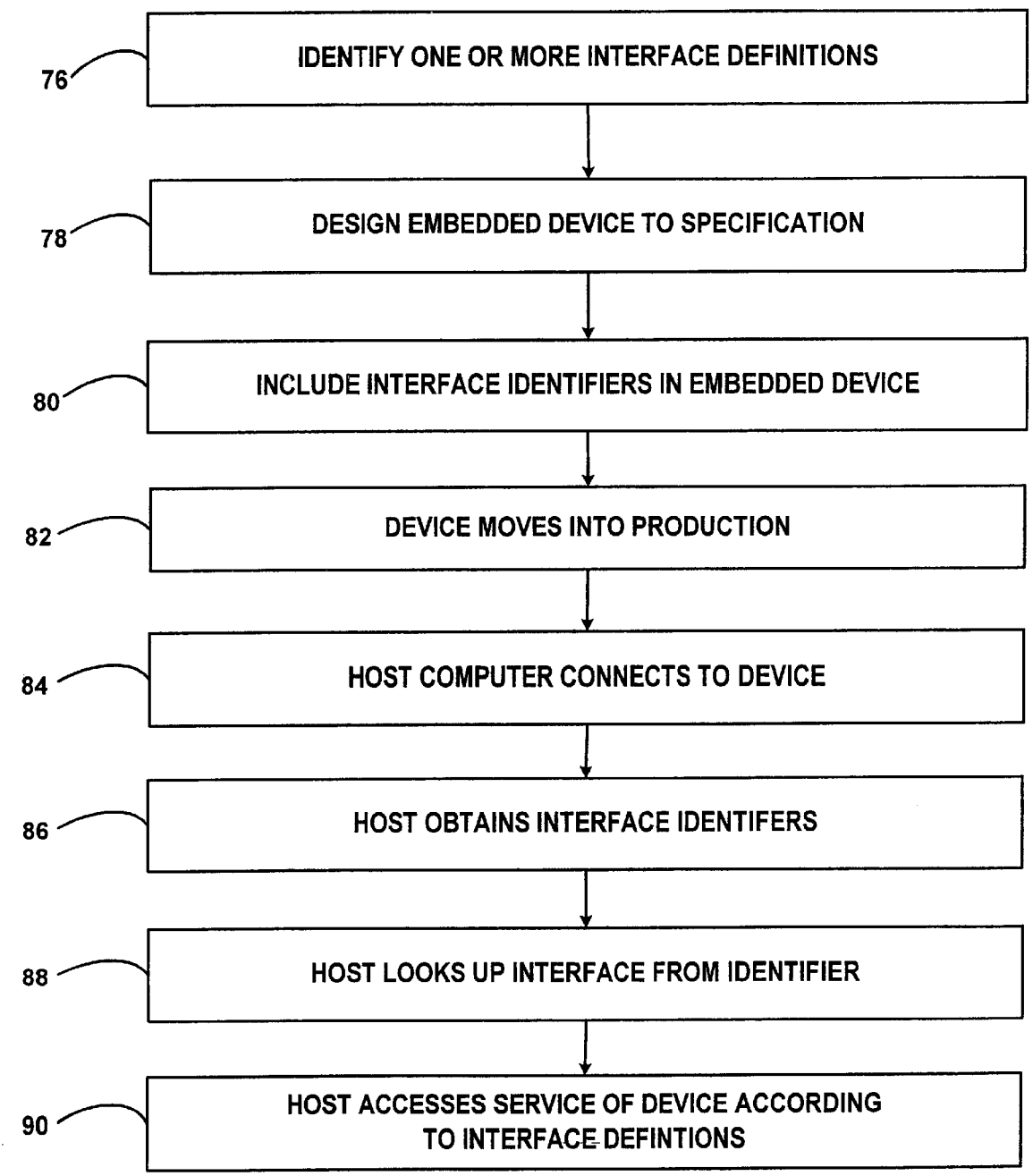
FIG. 8 is a flow diagram illustrating steps that may be followed in implementing the present embodiments.

FIG. 8 is a flow diagram showing steps that may be followed in implementing the present systems and methods. Typically, developers who wish to use and benefit from the disclosed embodiments are designing an embedded system that includes a remote computer 16 which will likely be interfacing with a host computer 12. The remote computer 16 communicates with the external devices 18, 20 for inputs and outputs. The developers typically are also designing an embedded application 28 that receives and processes device inputs 18 and generates outputs 20. One way to benefit from the systems and methods herein is shown in FIG. 8. Before actually designing and implementing a design for a remote computer's embedded application 28, a developer may identify 76 one or more interface definitions 60 available that are suitable for his or her situation. For example, if one were designing an embedded system for a telephone, one would identify suitable interface definitions 60 from a telephone category, from a communications devices category, from a cellular telephone category, or from any other suitable category of interface definitions 60.

After interface definitions 60 have been identified 76, the developer designs 78 and implements the embedded application to meet the specification of the interface definition 60. The developer should ensure that any functions, variables, events, files, states, behaviors and the like defined in the interface definition(s) 60 will be found in the newly designed application. The developer places 80 interface definition identifiers 64 within the code to be placed on the remote computer 16 such that the interface(s) supported by the device can be readily identified by the identifiers 64 without the need to send an entire description to the host computer 12.

After the device has been designed and tested, it may be moved 82 into production or use. Another computer may be connected 84 to the remote computer 16 for monitoring, controlling, or other uses. The host computer 12 may then request and obtain 86 from the remote computer 16 any interface definition identifiers 64. After any interface definition identifiers 64 are passed to the host computer 12, the host computer 12 may look up 88 in an interfaces database 62, 68 the particular interface definition 60. Once obtained from the database, the host computer 12 may access 90 the services of the embedded device according to the specification provided by the interface definition(s).

As shown in FIGS. 2 and 5, a separate embedded interface module 34 may be written. This embedded interface module 34 may be written so as to respond to various requests that may be received from the software at the host computer 12. By creating a separate interface module 34, the embedded application 28 may maintain focus on the services of the remote computer 16. In current design, the embedded application 28 is typically modified to make a function call into the embedded interface module 34 within its main operation loop to provide time for responding to requests from the host computer 12. The embedded interface module 34 performs some processing, and then returns back to the main operation loop. The interface module 34 should return control to the main operation loop within a short enough period of time so that the main operation loop will not miss any necessary events and/or processing.

In an alternative preferred embodiment, the embedded interface module 34 could be called by an interrupt service routine that is called periodically.

Figure 9:
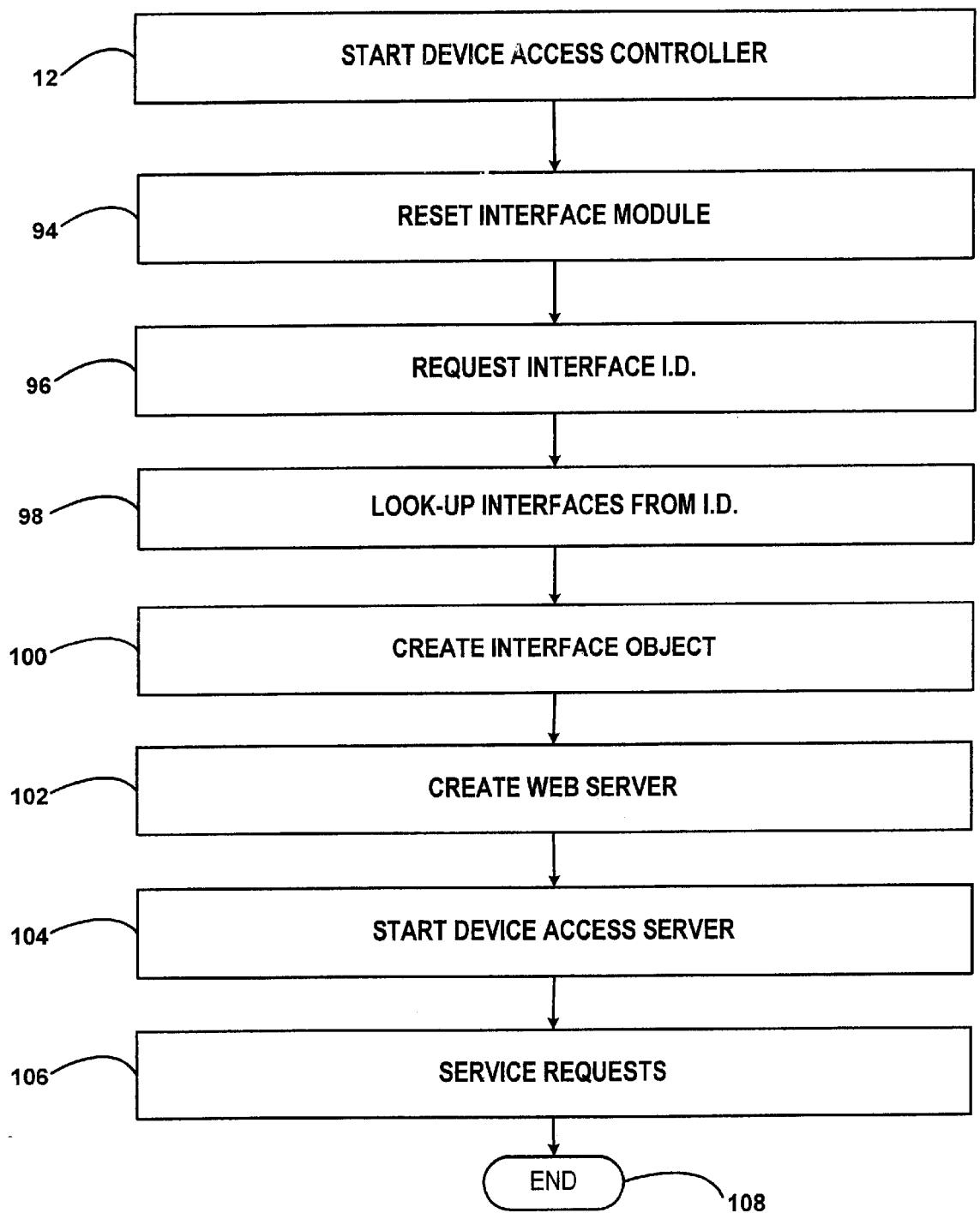
FIG. 9 is a flow diagram illustrating steps that may be followed in implementing software components at the host computer.

FIG. 9 is a flow diagram illustrating steps that may be followed in implementing software components at the host computer 12. Of course, different steps could be implemented to achieve the present embodiments. The steps of FIG. 9 are illustrative of the principles of the present systems and methods and are not meant to be limiting as to the breadth of the principles taught herein. To initiate the operation of software on the host computer 12, a user may start 92 the device access controller 46. The device access controller 46, in current design, includes the communication module 42 for communicating with the remote computer 16.

In current design, the device access controller 46 resets 94 the embedded interface module 34 to a known state. This includes resetting any state variables, data, etc. In the present embodiments, the embedded interface module 34 acknowledges the reset by sending an acknowledgment back to the device access controller 46.

The access controller 46 also requests 96 the interface definition identifiers 64 from the remote computer 16. Through the interface definition identifiers 64, the software running at the host computer 12 may become aware of what capabilities the remote computer 16 has. The host computer 12 then retrieves 98 or looks up 98 any identified interface definitions by use of the identifiers. By obtaining the interface definition(s), the software at the host computer 12 is able to create and maintain services information 44 about particular services at the remote computer 16. The host computer 12 may then present this information to a user at the host computer 12 or to client software requesting such information.

As explained above, the present embodiments may be implemented using object-oriented techniques. If a user wishes to use object-oriented techniques, a device interface object may be created 100. This device object may encapsulate all or some of the information retrieved from interface definition.

Any servers to be used at the host computer 12 in servicing requests from clients 22 need to be started. For example, a web server 48 could be started 102 to service requests from web browsers at client computers 22. In addition, or in the alternative, a device access server 50 could be started 104 for providing access to information about the remote computer 16 and also in providing access to the remote computer 16. As shown in FIG. 2, a client application 52 and/or a device access client 54 may be started on client computers 22. Once the software is running at the host computer 12, it acts to service 106 requests it receives. The software will typically continue servicing 106 requests until the software stops 108 running.

Unless a client application 52 is already aware of the services at the remote computer 16, it 52 first usually requests a list of available services. The server, either the web server 48, the device access server 50, or similar server, receives the request and retrieves the service information. Depending on whether the particular implementation of the present embodiments is using an object-oriented approach, the server could either retrieve the service information directly from the service information 44, or from a function designed and implemented to return such information, or from a device object.

The server then sends the services information to the client 52. Once the client knows what services are available at the remote computer 16, it may request certain data and/or actions relating to the services. The client may request a specific variable value. A user, through client software 52, may request a specific variable value from the remote computer 16 to know the state of events or data at the remote computer 16. For example, the remote computer 16 may be in electronic communication with a temperature sensor, and may store the temperature sensor data in a variable. A user may wish to know what that variable value is so as to know what temperature is being sensed at the remote computer 16.

The server receives the request for a particular value and may request the variable from the appropriate device object, or functionally equivalent software. The access controller, upon receiving this request, sends a message to the embedded interface module 34 requesting this value. The hardware and software communication pathway between the host computer and remote computer may be as shown and described in relation to FIG. 2.

Upon its next call for processing, the embedded interface module 34 receives the message and accesses the variable and reads the value contained therein. After retrieving the variable value, the embedded interface module 34 sends the value back to the object through the communication pathway. Once the object has received the value, it returns the value to the server. The server then answers the request from the client and sends the variable value to the client software.

As discussed in relation to FIG. 6, the present embodiments herein may implement security schemes for providing proper access to remote computers 16. FIG. 10 is a flow diagram illustrating steps that may be followed in using a security code to provide the proper interface to a client application. In an embodiment herein, a client application 52 may send 110 a request to the host computer 12 for device access. The device access server 50 may receive 112 the request and then query the client application for any security codes it may have. The client application 52 may then send 114 any security codes it may have.

If the client application 52 does not send any security codes, the device access server 50 may provide 116 the default interface or the interface not requiring any security codes. If security codes were sent, the device access server may look up the codes in the security database 70, find which interfaces should be provided based on that code, and then provide 118 the interface(s) indicated by the database 70 to the client application 52. The host computer 12 may then enter into a state of servicing 120 requests received by any client applications 52.

Commercially available software from emWare, Inc. is used in implementing the present embodiments. emWare, Inc. may be contacted through its web site at www.emware.com. One skilled in the art will appreciate how the commercially available software items from emWare can be used with the present embodiments. The following is a general and basic description of technology of emWare that is used in the present embodiments.

emWare's business centers around microcontrollers that manage many electronic devices used in today's world, including telephones, home appliances, office equipment, ATMs, security systems, VCRs, automobiles, etc. These microcontrollers are embedded into millions of intelligent electronic devices.

emWare has developed technology and software which provide distributed network-based device control. emWare's Embedded Micro Internetworking Technology (EMIT) software is designed to move the majority of software off of the embedded microcontroller and distribute it to more capable computers over a network. EMIT has also been developed to leverage existing Internet technologies.

Use of EMIT software involves various components including the following: the customer's embedded application 28, emMicro software (which correlates to the embedded interface module 34), emGateway software, emNet software (which correlates to the communication modules 38 and 42), and the customers monitoring/controlling application 52. Typically, potential customers of emWare already have embedded environments in which they plan to deploy emWare's EMIT software to enhance their monitoring and controlling capabilities. These embedded environments typically include the embedded system 14, the host computer 12, and client computers 22.

emMicro is used in the present embodiments on the remote computer 16 for relaying service information from the remote computer 16 to the host computer 12. Service information is information about the functions, variables, events and files of the embedded application 28 running on the remote computer 16.

The communications between the host computer 12 and the remote computer 16 running emMicro are usually accomplished via a lightweight network such as RS232, RS484, RF, or IR. The emNet component is responsible for handling communications between emMicro and the software on the host computer 12.

From the above discussion, it will be appreciated that the present embodiments provide access to an embedded system and the services available at the embedded system from a computer in electronic communication with the embedded system.

The embodiments herein may be embodied in other specific forms without departing from their spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

We claim:

1. A system for use in a networked computer system including a host computer and a remote computer, the remote computer being used to access a device, the system being implemented on the host computer and the system comprising:

a communications module for transferring data to and from a communications port of the host computer;

a data interface module for accessing an interface definition from a storage device in electronic communication with the host computer, wherein the accessing is accomplished through use of an interface definition identifier; and a device access controller for communicating with the remote computer via the communications module, the device access controller operating to obtain from computer program code loaded on the remote computer the interface definition identifier, the device access controller operating to access the storage device through the data interface module and the device access controller using the interface definition identifier to access the interface definition.

2. The system of claim 1 wherein the interface definition comprises information relating to the computer program code.

3. The system of claim 1, wherein the remote computer comprises application code, the application code providing services related to the device.

4. The system of claim 3, wherein the remote computer further comprises a services list on the remote computer, the list comprising information of certain services.

5. The system of claim 4, wherein the system further comprises an enumeration of services, the enumeration of services being a subset of the services.

6. The system of claim 4 wherein the information of the list is selected from the group consisting of functions, variables, data types, events and files.

7. The system of claim 1 further comprising a device access server, the device access server operating to receive a request from a client computer to provide access to the remote computer.

8. The system of claim 1 wherein a plurality of interface definition identifiers are obtained from the computer program code loaded on the remote computer.

9. The system of claim 8 wherein the device access controller obtains a plurality of interface definitions based on the plurality of interface definition identifiers and wherein the device access controller selects one interface definition to use based on security authorization data received from a client computer.

10. A computer system including a host computer and a remote computer, the remote computer being in electronic communication with a device, the computer system comprising:

embedded code on the remote computer, the embedded code providing services related to the device;

a communications module for transferring data to and from a communications port of the host computer;

a data interface module for accessing an interface definition from a storage device in electronic communication with the host computer, wherein the accessing is accomplished through use of an interface definition identifier;

a device access controller for communicating with the remote computer via the communications module, the device access controller operating to obtain from the embedded code the interface definition identifier, the device access controller operating to access the storage device through the data interface module and the device access controller using the interface definition identifier to access the interface definition, wherein the interface definition comprises information relating to the embedded code; and an encapsulation of services of the remote computer, the encapsulation of services being stored on the host computer and being created from the interface definition.

11. The system of claim 10, wherein the remote computer further comprises a services list on the remote computer, the list comprising information relating to the device.

12. The system of claim 11 wherein the information of the list is selected from the group consisting of functions, variables, data types, events and files.

13. The system of claim 11 further comprising a device access server, the device access server operating to receive a request from a client computer to provide access to the remote computer.

14. The system of claim 13 wherein a plurality of interface definition identifiers are obtained from the embedded code on the remote computer.

15. The system of claim 14 wherein the device access controller obtains a plurality of interface definitions based on the plurality of interface definition identifiers and wherein the device access controller selects one interface definition to use based on security authorization data received from the client computer.

16. A computer-readable medium containing instructions for enabling communications between a host computer and a remote computer where the remote computer interfaces with a device, wherein the instructions comprise executable instructions for implementing a method comprised of the steps of:

establishing electronic communications between the host computer and the remote computer;

receiving an interface definition identifier from computer program code on the remote computer;

accessing an interface definition from a storage device in electronic communication with the host computer, wherein the accessing is accomplished through use of the interface definition identifier;

providing an interface at the host computer for communicating with the remote computer, the interface being based on the interface definition; and facilitating communications with the remote computer via the interface wherein the communications facilitated relate to the device.

17. The computer-readable medium of claim 16 wherein the interface definition comprises information relating to the computer program code.

18. The computer-readable medium of claim 17 wherein the method further comprises the step of receiving a request from a client computer to provide access to the remote computer.

19. The computer-readable medium of claim 18 wherein the method further comprises the step of providing the interface to the client computer.

20. The computer-readable medium of claim 19 wherein the method further comprises the step of receiving an interface-based request from the client computer, wherein the interface-based request was created at the client computer through use of the interface.

21. The computer-readable medium of claim 20 wherein the method further comprises the step of sending a message to the remote computer from the host computer, wherein the message relates to the interface-based request.

22. The computer-readable medium of claim 21 wherein the method further comprises the step of receiving device data from the remote computer in response to the message sent to the remote computer.

23. The computer-readable medium of claim 16 wherein the method further comprises the step of receiving a plurality of interface definition identifiers from the computer program code on the remote computer.

24. A method for enabling communications between a host computer and a remote computer where the remote computer interfaces with a device comprising:

establishing electronic communications between the host computer and the remote computer;

receiving an interface definition identifier from computer program code on the remote computer;

accessing an interface definition from a storage device in electronic communication with the host computer, wherein the accessing is accomplished through use of the interface definition identifier;

providing an interface at the host computer for communicating with the remote computer, the interface being based on the interface definition; and facilitating communications with the remote computer via the interface wherein the communications facilitated relate to the device.

25. The method of claim 24 wherein the interface definition comprises information relating to the computer program code.

26. The method of claim 25 further comprising the step of receiving a request from a client computer to provide access to the remote computer.

27. The method of claim 26 further comprising the step of providing the interface to the client computer.

28. The method of claim 27 further comprising the step of receiving an interface-based request from the client computer, wherein the interface-based request was created at the client computer through use of the interface.

29. The method of claim 28 further comprising the step of sending a message to the remote computer from the host computer, wherein the message relates to the interface-based request.

30. The method of claim 29 further comprising the step of receiving device data from the remote computer in response to the message sent to the remote computer.

31. The method of claim 24 further comprising the step of receiving a plurality of interface definition identifiers from the computer program code on the remote computer.

* * * * *